UNITED STATES PATENT OFFICE.

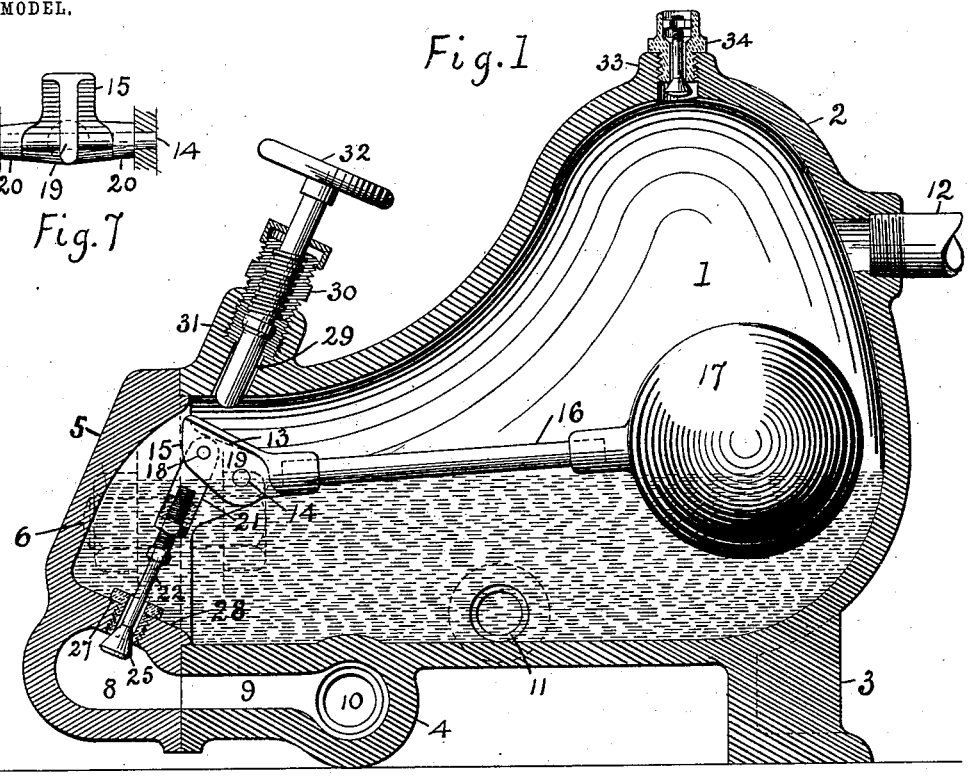

JOSEPH L. CHAPMAN, OF HADDONFIELD, NEW JERSEY, ASSIGNOR TO WATSON & McDANIEL CO., OF PHILADELPHIA, PENNSYLVANIA.

STEAM-TRAP.

SPECIFICATION forming part of Letters Patent No. 722,400, dated March 10, 1903.

Application filed March 22, 1902. Serial No. 99,415. (No model.)

*To all whom it may concern:*

Be it known that I, JOSEPH L. CHAPMAN, a citizen of the United States, residing at Haddonfield, in the county of Camden and State of New Jersey, have invented certain new and useful Improvements in Steam-Traps, of which the following is a specification.

My invention relates to steam-traps for the collection and discharge of condense water from steam-pipes or like apparatus, and wherein the opening and closing of the discharge-valve is regulated by a float.

By the arrangement of the parts in my trap the counterweight is dispensed with and its cost saved, the ball-float in my trap being so arranged as to tend to close the valve, while the steam-pressure tends to open the valve, which is the reverse of traps with valves above the seats, where the pressure closes the valve, and a light and counterweighted float must be used to open the valve. With my arrangement a ball of weight sufficient to overcome the steam-pressure is used. The float being of heavier material its liability to collapse is also eliminated. My valve being below the seat, any dirt or other matter which would tend to damage the valve or its seat will not lodge, but be forced away when the valve is depressed, as the water passes the valve in a hollow jet instead of in a solid column, as heretofore and with the old style of trap. The spreading of the water as it leaves the trap adds much to the trap's time of service, as the dripping is diffused and not concentrated upon a small surface, as heretofore, and which caused the trap-case to be soon eaten through and destroyed. I have also provided adjusting means for connecting the valve and the float-lever, so that my trap can be positively regulated as to the water seal, the float's position, and the accumulation of condensation therein. This adjustment also permits new valves to be substituted for worn ones without the replacing of other parts. By making the trap with an end opening to which all of the movable parts are attached and to which no pipes are attached, the valve and its seat also being in the cover, the working parts can all be removed by slackening two nuts and no pipe connections be broken, resulting in saving much time and expense.

I have also provided a simple automatic air-valve of only three parts—the seat, the valve, and nut—which can quickly be adjusted as to the amount of escape area by running the nut up or down on the stem, and all springs are done away with. The nut is guided up and down by the seat, and the air-escape is through openings formed in the nut. Where much air needs to be removed, the valve can be dropped to allow its escape, and the adjustment of the valve to a high or low position will regulate the air-escape, both as to volume and time.

My invention is illustrated in the accompanying drawings, in which—

Figure 1 is a central longitudinal section of the case, some other parts not being in section. Fig. 2 is a view at the cover end, the cover being removed. Figs. 3, 4 are views of the valve, its seat, and the adjustable connections, partly in section. Fig. 5 is a vertical section of the air-valve seat and wing-nut, the valve not being in section. Fig. 6 is a plan view of Fig. 5. Fig. 7 is a front elevation of the fulcrum-bearing.

Similar figures of reference indicate similar parts throughout the views.

The trap-case 1 is a round section at its open-ended part and at its back part has a rounded dome 2, the case being supported upon a leg 3 at the back, and upon the outlet-pipe case 4, near its front end, a cover 5 closes the open end and is held by two bolts 6, placed in open lugs 7, the cover being provided with similar lugs. Within cover 5 at its lower part is formed drain-pocket 8, which communicates with drain-pocket 9 of the case and therethrough with drain-pipe 10. The case 1 has also a blow-out pipe 11 and an inlet-pipe 12. Cover 5 has two lugs 13 projecting into the trap, and between the lugs on pin 14 is a fulcrum-bearing 15, of T-section, forming a part of the float-lever 16, the float 17 being attached to the other end of lever 16, so that the drain-valve and float move in opposite directions. The web 19 of part 15 permits the placing of pin 18 in any desired position for leverage, as it is formed to be drilled so that pin 18 may be placed in different positions through web 19 at the time of manufacture or later, to suit the pressure the trap is desired to carry, as the double hubs 20 are removed from each other to clear bifurcations 21. At an angle forward of pin 14 is another pin 18, secured in web 19 of fulcrum-bearing 15 and also passing through the bifurcated connection 21 of the valve-stem 22, which is screw-threaded to connection 21 and provided with a lock-nut 23. The stem 22 has a hexagonal enlargement 24, by which it is turned to lengthen and shorten the distance between pin 18 of the fulcrum-bearing 20 and the valve 25, formed at the lower end of stem 22. The valve is coned from stem 22 downward and enters opening 26 in seat 27 and controls fluid flowing through opening 26 to drain-passage 8 in the cover 9 in the trap-case, and drain-pipe 10 secured to the case. Seat 27 is screw-threaded into part 28 of cover 5.

It will be seen that the valve, the float, and their connections are removed from the case whenever cover 5 is removed without disconnecting any pipes.

In direct line with the valve, its stem, and adjustable connection is a blow-off stem 29, screw-threaded in a stuffing-box 30, secured in lug 31 and provided with a hand-wheel 32. The stem when screwed down depresses bearing 15, lifting float 17 and opening passage 26 by moving valve 25 off its seat. At the top of dome 2 is a boss 33, into which is screwed an air-valve seat 34, having a small passage 35 through its lower part and a larger passage 36 through its upper part, the two passages being joined by a cone 37. A conical air-valve 38 seats at the lower end of passage 35 and is provided with a stem 39, upwardly tending and screw-threaded at its upper part, and thereon is a nut 40, which is adapted to be turned up and down for the adjustment of the valve close to or removed from its seat, and it is provided with wings 41, circular at their outer ends to guide it within passage 36. Between the wings are openings 42 to permit air-escape from the trap when valve 38 is not pressed to its seat by pressure within the trap.

I claim—

1. In a steam-trap, a case, an opening therefor at one end, a dome at the other end, a cover to close the opening, means to drain the trap, through its valve which is seated within the cover in a passage communicating with a passage in the trap-case, and therethrough to the drain-pipe, and a float having means to control the valve against the pressure within the trap, in the manner substantially as described.

2. In a steam-trap, a case, an end opening therefor, a cover for the opening, a float within the case, a coned valve, a drainage-passage in the cover and in communication with a drainage-passage in the trap-case controlled by the valve for its opening as the valve moves down, and for its closing as the valve moves up, connections from the float to the valve whereby the valve is controlled as described and the valve, the float and their connections attached to and supported by the cover in manner for their removal from within the trap whenever the cover is removed without disturbance of the drainage connections to the trap-case, substantially as set forth.

3. In a steam-trap, a case having an end opening and a cover therefor, a float fulcrumed upon the cover, a coned drain-valve in the cover and controlled by the float in manner to move the valve down to open the drain-passage, and to move the valve up to close the drain-passage, a drain-passage in the trap-case in communication with the drain-passage in the cover, and a drain-pipe attached to the case and connecting therewith, substantially as set forth.

4. As a new article of manufacture, an air-valve of cone shape, and having a threaded stem at its small end, a seat for the valve, passages through the seat of different diameters, the smaller diameter being at the valve end, a nut adapted to be adjusted, upon the stem, closely fitting within and guided by the larger-diameter passage and whereby the valve's movement is increased or decreased to facilitate or retard air escape, and passages formed in the nut for air-escape, substantially as set forth.

5. In a steam-trap a case, a valve, a float arranged to move in direction opposite to the valve, a lever for the float, a fulcrum, an extension of the lever beyond the fulcrum and to which the valve is attached, and means located upon the case, in line with the valve, operative upon the lever extension, and whereby the valve may be opened, exterior to the case, for blow-out purposes.

In testimony whereof I affix my signature in presence of two witnesses.

JOSEPH L. CHAPMAN.

Witnesses:
  RANSOM C. WRIGHT,
  WILLIAM C. STOEVER.